(12) United States Patent
Park (10) Patent No.: US 8,149,816 B2
(45) Date of Patent: Apr. 3, 2012

(54) HEADER COMPRESSION AND PACKET TRANSMISSION METHOD IN SENSOR NETWORK AND APPARATUS THEREFOR

(75) Inventor: Soo-hong Park, Gwanglu-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 770 days.

(21) Appl. No.: 12/104,748

(22) Filed: Apr. 17, 2008

(65) Prior Publication Data

US 2008/0259902 A1 Oct. 23, 2008

Related U.S. Application Data

(60) Provisional application No. 60/912,539, filed on Apr. 18, 2007.

(30) Foreign Application Priority Data

Jul. 10, 2007 (KR) .................. 10-2007-0069211

(51) Int. Cl.
*H04J 3/24* (2006.01)
(52) U.S. Cl. ...................................... 370/349
(58) Field of Classification Search .............. 370/338, 370/349, 392, 395.1, 401, 466, 477, 521
See application file for complete search history.

(56) References Cited

U.S. PATENT DOCUMENTS

| | | | | |
|---|---|---|---|---|
| 2004/0120357 A1* | 6/2004 | Kekki | ............ | 370/521 |
| 2005/0135360 A1 | 6/2005 | Shin et al. | | |
| 2005/0207418 A1* | 9/2005 | Tang et al. | ............ | 370/392 |
| 2006/0088051 A1* | 4/2006 | Mulligan | ............ | 370/466 |
| 2006/0092896 A1* | 5/2006 | Mulligan et al. | ............ | 370/338 |
| 2007/0255120 A1* | 11/2007 | Rosnov | ............ | 600/300 |
| 2008/0056261 A1* | 3/2008 | Osborn et al. | ............ | 370/392 |
| 2008/0080559 A1* | 4/2008 | Singh | ............ | 370/477 |

OTHER PUBLICATIONS

"Transmission of IPv6 Packets over IEEE 802.15.4 Networks", Network Working Group Request for Comments 4494, Sep. 2007, 29 pgs.
"Transmission of IPv6 Packets over IEEE 802.15.4 Networks draft-ietf-6lowpan-format-13", Network Working Group Internet-Draft, Apr. 2, 2007, 29 pgs.
International Search Report issued in International Application No. PCT/KR2008/001861 on Jul. 29, 2008.
Sakane, S. et al.; 'A translation method between 802.15.4 nodes and IPv6 nodes'; Applications and the Internet Workshops, 2006. Saint Workshops 2006. International Symposium on; Jan. 23-27, 2006.
Westphal, C.; 'Layered IP Header Compression for IP-enabled Sensor Networks'; Communications, 2006 IEEE International Conference on; vol. 8; Jun. 2006; pp. 3542-3547.

* cited by examiner

*Primary Examiner* — Kwang B Yao
*Assistant Examiner* — Jung-Jen Liu
(74) *Attorney, Agent, or Firm* — Staas & Halsey LLP (57) ABSTRACT

A header compression and packet transmission method in a sensor network and an apparatus therefor, for selecting technologies related to Internet Protocol (IP) header compression according to characteristics of each node, and processing the technologies. The header compression and packet transmission method and apparatus therefor distinguishes a node supporting the adaptation layer function and a node that does not support the adaptation layer function, and determines whether to compress the packet, thereby enabling a node transmitting data to transmit the data having a proper form that is acceptable to a sensor node receiving the data. By doing so, an efficient packet transmission is possible.

23 Claims, 4 Drawing Sheets

| Command Identifier | Command Type |
|---|---|
| 1 | Association Request |
| 2 | Association Response |
| 3 | Disassociation Notification |
| 4 | Data Request |
| 5 | PAN ID Conflict Notification |
| 6 | Orphan Notification |
| 7 | Beacon Request |
| 8 | Coordinator Realignment |
| 9 | GTS Request |
| (10-255) | (Reserved) |
| 100 | Adaptation Layer Capability Request |
| 101 | Adaptation Layer Capability Acknowledgement |
| 102 | Adaptation Layer Capability Reject |

130

HEADER COMPRESSION AND PACKET TRANSMISSION METHOD IN SENSOR NETWORK AND APPARATUS THEREFOR

CROSS-REFERENCE TO RELATED APPLICATIONS

This application claims the benefit of Korean Patent Application No. 2007-69211, filed in the Korean Intellectual Property Office on Jul. 10, 2007, and the benefit of U.S. Provisional Patent Application No, 60/912,539, filed in the U.S. Patent and Trademark Office on Apr. 18, 2007, the disclosures of which are incorporated herein by reference.

BACKGROUND OF THE INVENTION

1. Field of the Invention

Aspects of the present invention relate to wireless communication, and more particularly, to a technology for compressing and transmitting a header in a sensor network.

2. Description of the Related Art

A sensor network is known as a Ubiquitous Sensor Network (USN) or a Wireless Sensor Network (WSN). Such sensor networks have spread across the world. Recently, based on the Institute of Electrical and Electronics Engineers (IEEE) 802.15.4 technology, an upper network technology has been standardized in ZigBee, and the Internet Engineering Task Force (IETF) is researching header compression technology for reducing an Internet Protocol version 6 (IPv6) header having 40 bytes in an IEEE 802.15.4 Wireless Personal Area Network (WPAN) period. The IPv6 header compression technology based on IEEE 802.15.4 is described in the internet draft "http://www.ieff.org/internet-drafts/draft-ieff-6lowpan-format-13.txt" which was published as a Request for Comments (RFC) 4944 (http://www.ieff.org/rfc/rfc4944.txt) on Sep. 25, 2007.

However, nodes in a sensor network are characterized as having low-power and low-capacity, and thus it is difficult for the nodes to perform operations necessary for compression using header compression technology based on a new standard.

SUMMARY OF THE INVENTION

Aspects of the present invention provide a header compression and packet transmission method in a sensor network and an apparatus therefor, for selecting technologies related to Internet Protocol (IP) header compression according to characteristics of each node, and processing the technologies.

Additional aspects of the present invention provide a computer readable recording medium having recorded thereon a program to execute the header compression and packet transmission method in the sensor network.

According to an aspect of the present invention, a header compression and packet transmission method in a sensor network is provided. The header compression and packet transmission method comprises transmitting an inquiry message to a sensor node in the network inquiring whether the sensor node supports an adaptation layer function; receiving a reply message transmitted from the sensor node using a function of a lower layer used by the sensor node; analyzing the reply message and determining whether the sensor node supports the adaptation layer function according to the analyzed reply message; compressing an IP (Internet Protocol) header and transmitting a packet with the compressed IP header to the sensor node when it is determined that the sensor node supports the adaptation layer function; and transmitting a packet to the sensor node without compressing an IP header when it is determined that the sensor node does not support the adaptation layer function.

According to another aspect of the present invention, the adaptation layer is an IEEE (Institute of Electrical and Electronics Engineers) 802.15.4 ZigBee adaptation layer.

According to another aspect of the present invention, the lower layer used by the sensor node is an IEEE 802.15.4 MAC (Media Access Control) layer.

According to another aspect of the present invention, the transmitting the inquiry message includes designating a value from among reserved values in a command type field of an IEEE 802.15.4 MAC frame designated as an adaptation layer capability request type; and setting the value corresponding to the adaptation layer capability request type in a command type field of an IEEE 802.15.4 MAC frame in the inquiry message.

According to another aspect of the present invention, the determining of whether the sensor node supports the adaptation layer function comprises determining that the sensor node supports the adaptation layer function when a value corresponding to an adaptation layer capability acknowledgement type is set in a command type field of an IEEE 802.15.4 MAC frame comprised in the reply message.

According to another aspect of the present invention, the determining of whether the sensor node supports the adaptation layer function may include, when a value corresponding to an adaptation layer capability reject type is set in the command type field of the IEEE 802.15.4 MAC frame comprised in the reply message, the operation of determining that the sensor node does not support the adaptation layer function.

According to another aspect of the present invention, a header compression and packet transmission apparatus in a sensor network is provided. The header compression and packet transmission apparatus includes an inquiry message transmission unit to transmit an inquiry message to a sensor node in the sensor network inquiring whether the sensor node supports an adaptation layer function; a reply message reception unit to receive a reply message corresponding to the inquiry message and transmitted from the sensor node by using a function of a lower layer used by the sensor node; a determination unit to analyze the received reply message and to determine whether the sensor node supports the adaptation layer function; a header compression unit to compress an IP header in a packet when the determination unit determines that the sensor node supports the adaptation layer function, and which does not compress an IP header in a packet when the determination unit determines that the sensor node does not support the adaptation layer function; and a packet transmission unit to transmit the packet to the sensor node.

According to another aspect of the present invention, the inquiry message transmission unit determines a value from among reserved values in a command type field of an IEEE 802.15.4 MAC frame as an adaptation layer capability request type, and sets the value corresponding to the adaptation layer capability request type in a command type field of an IEEE 802.15.4 MAC frame in the inquiry message.

According to another aspect of the present invention, the determination unit determines that the sensor node supports the adaptation layer function when a value corresponding to an adaptation layer capability acknowledgement type is set in a command type field of an IEEE 802.15.4 MAC frame comprised in the reply message.

According to another aspect of the present invention, the determination unit determines that the sensor node does not support the adaptation layer function when a value corresponding to an adaptation layer capability reject type is set in the command type field of the IEEE 802.15.4 MAC frame comprised in the reply message.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
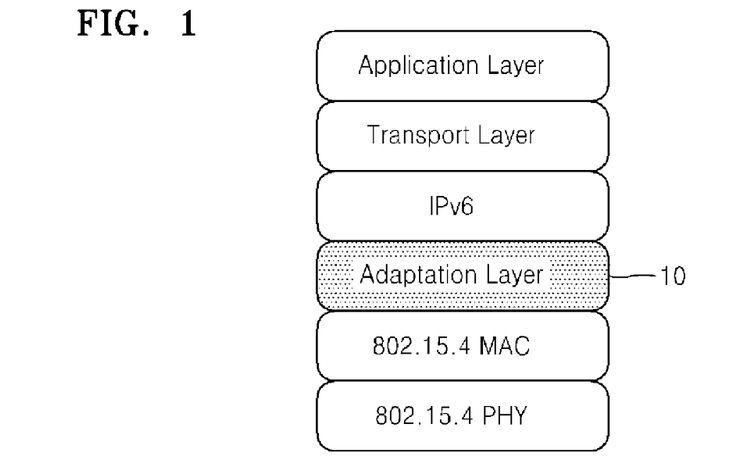
FIG. 1 is a diagram illustrating a ZigBee network layer based on the Institute of Electrical and Electronics Engineers (IEEE) 802.15.4 standard.

FIG. 1 shows a ZigBee network layer based on Institute of Electrical and Electronics Engineers (IEEE) 802.15.4. As shown in FIG. 1, the network layer based on IEEE 802.15.4 (hereinafter, referred to as '802.15.4') further includes an adaptation layer 10 added to the general Open Systems Interconnection (OSI) seven layer model. The 802.15.4 adaptation layer 10 is located between an Internet Protocol version 6 (IPv6) layer and an 802.15.4 Media Access Control (MAC) layer, and compresses an IPv6 header. The 802.15.4 adaptation layer 10 is currently being standardized by an IPv6 over Low-Power Wireless Personal Area Networks (6LoWPAN) working group within the Internet Engineering Task Force (IETF).

Figure 2:
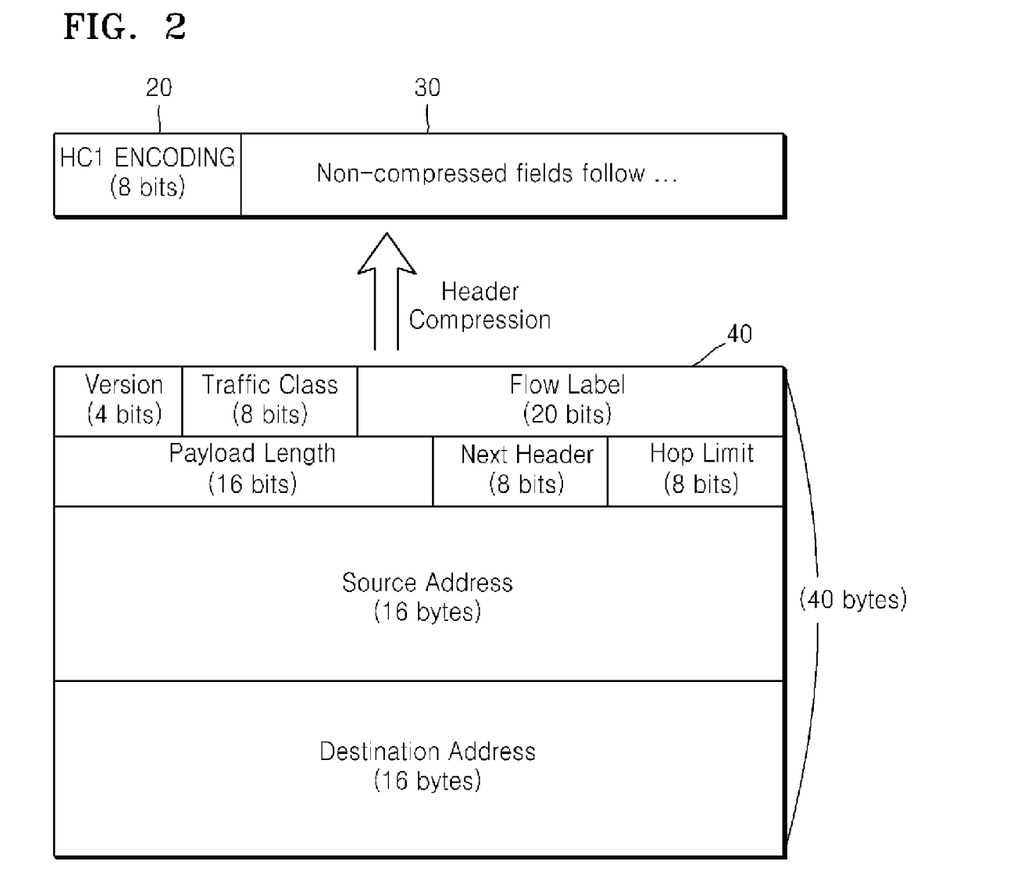
FIG. 2 is a diagram illustrating header compression performed by an 802.15.4 adaptation layer.

FIG. 2 shows header compression performed by an 802.15.4 adaptation layer 10. An IPv6 header 40 that has 40 bytes is shown in the lower part of FIG. 2. A header compressed by the 802.15.4 adaptation layer 10 is shown in the upper part of FIG. 2. The 802.15.4 adaptation layer 10 compresses the IPv6 header 40 that has 40 bytes, and thereby generates a new header 20 that has 8 bytes. Not every field of IPv6 is compressed; uncompressed fields 30 are added to the rear of the compressed new header 20. For example, a hop limit field within an IPv6 header is not compressed. The hop limit field has an 8-bit length, and indicates a maximum number of hops in which an IP packet may be transmitted.

Figure 3:
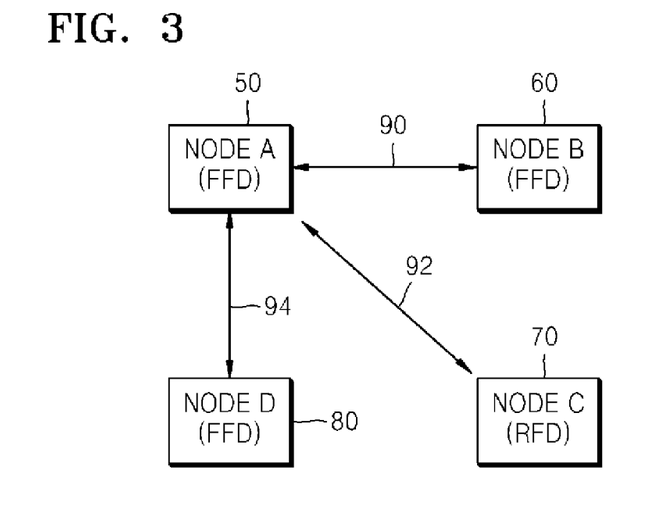
FIG. 3 is a diagram illustrating a network environment in which 802.15.4 header compression and packet transmission are applied.

FIG. 3 shows a network environment in which 802.15.4 header compression and packet transmission are applied. An 802.15.4 node A 50 detects contents of a header having 40 bytes of an IPv6 packet generated in an IPv6 layer. According to a manner defined by the 6LoWPAN working group within the IETF, an IPv6 header having 40 bytes is compressed as a header having 8 bits. However, a hop limit field having 8 bits is not compressed. The header having 8 bits newly generated by the adaptation layer 10 is transmitted to a lower layer that is an 802.15.4 MAC layer. Corresponding data including the 8-bit header is transmitted to another node via an 802.15.4 Physical (PHY) medium.

An example in which a packet is transmitted to a node B 60 will now be described. The node B 60 that received the packet interprets a value of the header having 8 bits in an adaptation layer 10. By doing so, the IPv6 header 40 having 40 bytes generated in the original node A 50 is reassembled. Since upper layer values of the IPv6 layer, such as Transmission Control Protocol (TCP) and User Datagram Protocol (UDP), are also compressed as a header having 8 bits, the upper layer values have to be reassembled. In addition, since a value of the hop limit field having the 8-bit length of the IPv6 header is transmitted without being compressed, the value of the hop limit field is to be included in the IPv6 header as is, and remaining sections of the original IPv6 header is to be reassembled. The reassembled header is transmitted to an IPv6 layer of the node B 60.

Due to characteristics of the sensor network, a characteristic of a medium transmitted between nodes is very restricted. Due to characteristics of transmission in a wireless period, it is difficult to provide high capacity for data transmission. Thus, in such an environment, it is not efficient to include a header having 40 bytes whenever the data is transmitted. Hence, the IETF provides a method of compressing an IPv6 header by creating the adaptation layer 10. However, the method involves compressing an IPv6 header 40 having 40 bytes is compressed as a new header having 8 bits by the adaptation layer 10, and reassembling the IPv6 header 40 from the compressed header using information on the compressed header having 8 bits. These operations burden a sensor node. In some cases, compressing the IPv6 header 40 may be less efficient than directly transmitting a packet without compressing the IPv6 header 40.

In addition, header compression in an 802.15.4 environment may be possible in a Full Function Device (FFD), but not in a Reduced Function Device (RFD). Since a function of the RFD is very restricted, the RFD may not have an adaptation layer. Even the RFD with an adaptation layer may not perform header compression depending on available resources. In the case of the FFD, if the FFD does not have the adaptation layer, the FFD cannot perform the header compression. When a node does not have an adaptation layer, or when a node cannot perform header compression although the node has the adaptation layer, such nodes are defined to be nodes that do not support an adaptation layer function.

Not every node supports the adaptation layer function. In order to transmit a packet to nodes within a sensor network from a node supporting the adaptation layer function, a packet transmission to a node supporting the adaptation layer function and a packet transmission to a node not supporting the adaptation layer function should be distinguished, and thereby a packet should be fragmented into a plurality of packets according to a link characteristic.

A procedure in which a packet is transmitted from the node A 50 to the node B 60, a node C 70, and a node D 80 is shown in FIG. 3. The node B 60 is an FFD that supports the adaptation layer function. In operation 90, the node A 50 compresses an IPv6 header 40 using the adaptation layer function, and transmits a packet including the compressed header to the node B 60. The node C 70 is an RFD, and lacks resources to process the adaptation layer function. When transmitting a packet to node C in operation 92, the node A 50 does not compress the IPv6 header 40 of the packet, but instead fragments a packet according to a characteristic of a corresponding wireless link and transmits the packet). The node D 80 is an FFD, but does not have the adaptation layer 10. When transmitting a packet to the node D 80 in operation 95, the node A 50 does not compress the IPv6 header 40 of the packet, but instead fragments a packet according to a characteristic of a corresponding wireless link and transmits the packet.

Aspects of the present invention to provide a function for informing each node whether corresponding nodes provide an upper adaptation layer function by using a lower technology such as 802.15.4 used by a sensor node, and a function for transmitting an IPv6 header after being fragmented in communication with a FFD and RFD or with nodes that do not have an adaptation layer 10 or that are insufficient for processing the adaptation layer function. In a case of not only IPv6 but also IPv4, when required functions related to a header compression function in an IP layer are included in a sensor node, aspects of the present invention provide optimized communication by enabling each node to mutually determine whether each node is capable of processing the header compression functions.

In communication between nodes in an IEEE 802.15.4 MAC, aspects of the present invention allows a node to inform another node about whether a corresponding node supports the adaptation layer function. Aspects of the present invention provide to a node a function for informing another node whether a corresponding node having the adaptation layer function is capable of processing the adaptation layer function.

According to some aspects of the present invention, a reserved area of a MAC command frame may be used. Pre-existing frames may be extended so that whether an adaptation layer 10 is supported is informed in the form of a flag.

Sensor nodes form a connection for communication with surrounding nodes. In the case of star topology based on 802.15.4, the nodes connect to a Personal Area Network (PAN) coordinator. Nodes are also connected in peer-to-peer communication. Other topologies or network layouts may be employed as well. After connection between the nodes, the nodes mutually check via communication of a MAC layer whether the respective nodes have the adaptation layer function, or whether the respective nodes having the adaptation layer function are in an improper environment for processing the adaptation layer function.

In the case of a MAC command frame based on 802.15.4, whether the adaptation layer function is supported may be recognized by having an adaptation layer capability frame and communicating between nodes. Pre-existing frames may be extended to have an adaptation layer capability flag to inform whether an adaptation layer is supported.

When data is transmitted to a node supporting an adaptation layer function, an IPv6 header 40 having 40 bytes is compressed and a packet including the compressed IPv6 header is transmitted. Where a node does not have an adaptation layer 10 or a node is currently in an improper status for using an adaptation layer 10 although the node has the adaptation layer, a corresponding data packet including an uncompressed IPv6 header 40 is transmitted to the node. If necessary, the corresponding data packet may be fragmented into a plurality of packets and then transmitted.

Figure 4:
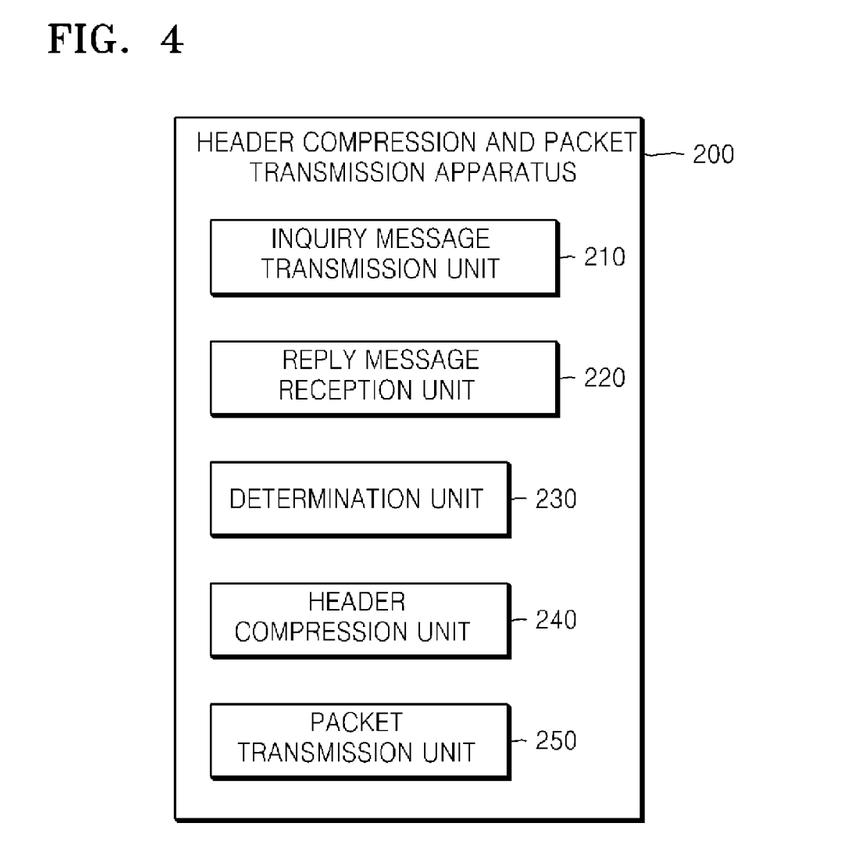
FIG. 4 is a block diagram illustrating a structure of a header compression and packet transmission apparatus, according to an embodiment of the present invention.

FIG. 4 shows a structure of a header compression and packet transmission apparatus 200, according to an embodiment of the present invention. The header compression and packet transmission apparatus 200 includes an inquiry message transmission unit 210, a reply message reception unit 220, a determination unit 230, a header compression unit 240, and a packet transmission unit 250. According to other aspects of the invention, the apparatus 200 may have additional and/or different units and can be included in a node. Similarly, the functionality of two or more of the above units may be combined into a single component.

Figure 5:
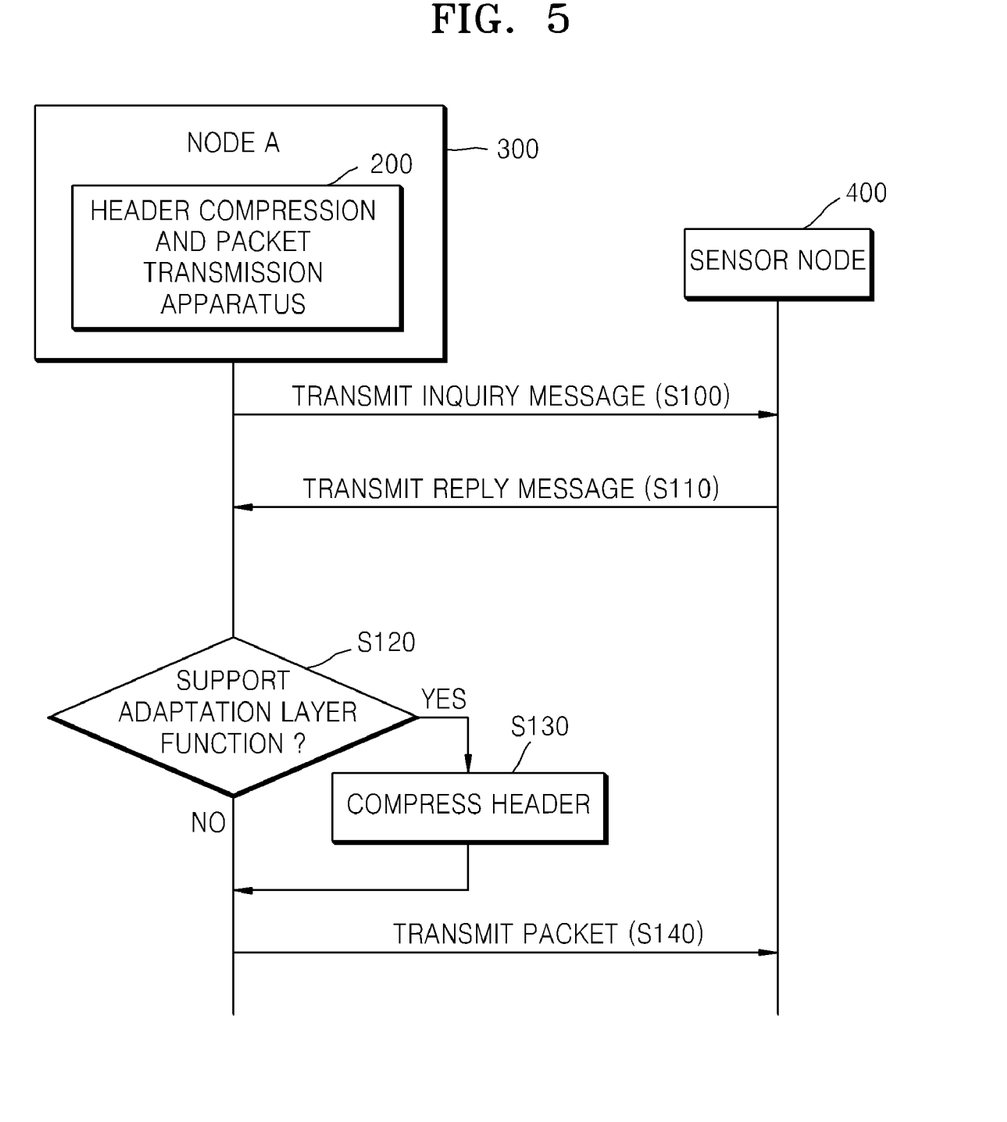
FIG. 5 is a diagram illustrating a procedure in which a header is compressed in a node including a header compression and packet transmission apparatus and a packet is transmitted from the node to a sensor node, according to an embodiment of the present invention.

FIG. 5 shows a procedure in which a header is compressed in a node A 300 including a header compression and packet transmission apparatus 200 and a packet is transmitted from the node A 300 to a sensor node 400, according to an embodiment of the present invention. The inquiry message transmission unit 210 transmits an inquiry message to the sensor node 400 in operation S100. The inquiry message is a message that inquires whether the sensor node 400 supports an adaptation layer function. The form of the inquiry message will be more specifically described later with reference to FIGS. 6 and 7.

The sensor node 400 transmits a reply message corresponding to the inquiry message in operation S110. The sensor node 400 transmits the reply message using a function of a lower layer. The lower layer used by the sensor node 400 may be an IEEE 802.15.4 MAC layer, but is not restricted thereto. The form of the reply message related to such a case will be more specifically described later with reference to FIGS. 6 and 7.

The reply message reception unit 220 of the node A 300 receives the reply message transmitted from the sensor node 400. The determination unit 230 analyzes the reply message, and determines whether the sensor node 400 supports the adaptation layer function in operation S120.

If the sensor node 400 is determined to support the adaptation layer function, the header compression unit 240 performs header compression in operation S130. If the sensor node 400 does not support the adaptation layer function, the header compression unit 240 does not compress an IP header within a packet. The packet transmission unit 250 transmits a packet with the IP header (compressed or uncompressed) to the sensor node 400 in operation S140.

Figure 6:
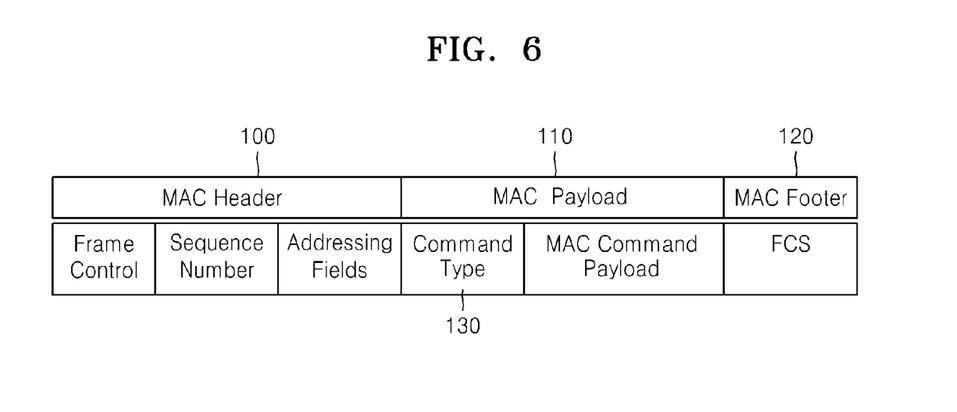
FIG. 6 is a diagram illustrating a message format that is used by an 802.15.4 MAC layer, according to another embodiment of the present invention.

FIG. 6 shows a message format that is used by an 802.15.4 MAC layer, according to another embodiment of the present invention. A message of the 802.15.4 MAC layer includes a MAC header 100, a MAC payload 110, and a MAC footer 120. The MAC header 100 includes a frame control, a sequence number, addressing fields, and the like. The MAC payload 110 includes a command type field 130, a MAC command payload, and the like. The MAC footer 120 includes a Frame Check Sequence (FCS), and the like.

Figure 7:
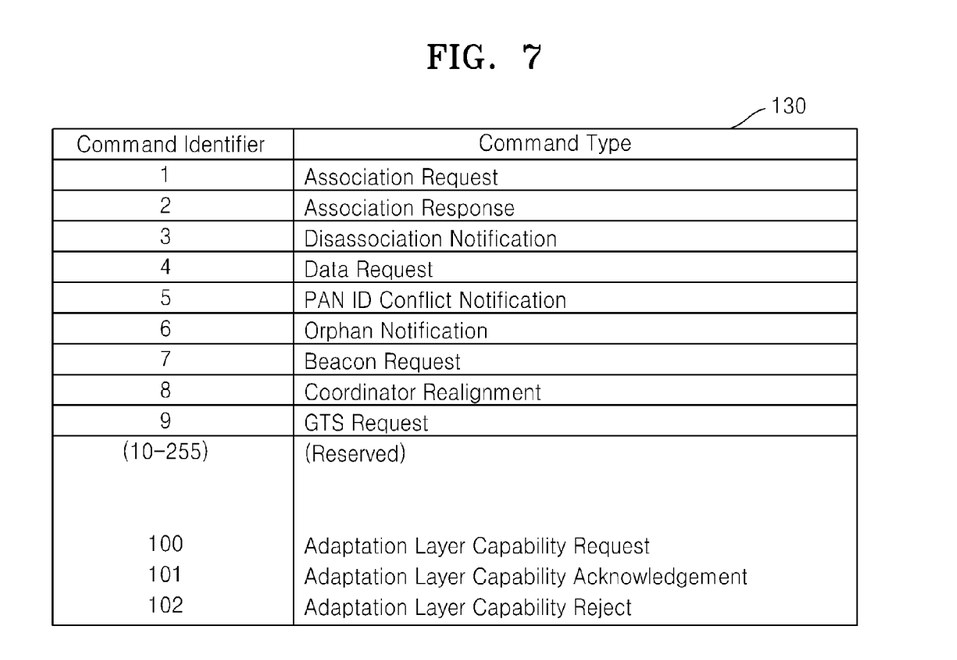
FIG. 7 is a diagram illustrating a format of a command type field of a MAC command frame, according to another embodiment of the present invention.

FIG. 7 shows a format of a command type field 130 of a MAC command frame, according to another embodiment of the present invention. The command type field 130 of the MAC command frame includes a command identifier indicating a command type. For example, if a value of the command type field 130 is 1, a MAC command type is an association request.

Three values are selected from among reserved values of the command type field 130, and three command types, which are an adaptation layer capability request, an adaptation layer capability acknowledgement, and an adaptation layer capability reject, are designated. For example, values 100, 101, and 102 may be respectively designated as the adaptation layer capability request, the adaptation layer capability acknowledgement, and the adaptation layer capability reject. Such value designation is not limited to the above mentioned example; if a value is selected from among reserved values, selection of any value may be possible.

The inquiry message transmission unit 210 sets a value corresponding to the adaptation layer capability request in the command type field 130. The sensor node 400 interprets the command type field 130 included in the MAC payload 110. If the value corresponds to the adaptation layer capability request, the sensor node 300 may recognize that a received message is the inquiry message.

Depending on whether the sensor node 400 itself supports the adaptation layer function, the sensor node 400 sets a value corresponding to either the adaptation layer capability acknowledgement or the adaptation layer capability reject in the command type field 130 of the replay message, and transmits the value.

If the sensor node 400 includes the adaptation layer 10 and has resources enough to perform the adaptation layer function, the sensor node 400 sets a value corresponding to the adaptation layer capability acknowledgement indicating that the adaptation layer function is supported. If the sensor node 400 does not include the adaptation layer 10 or have resources enough to perform the adaptation layer function, the sensor node 400 sets a value corresponding to the adaptation layer capability reject indicating that the adaptation layer function is not supported.

According to some aspects of the invention, by not replying to the inquiry message from the node A 300, the sensor node 400 informs the node A 300 that the sensor node 400 does not support the adaptation layer function. In such a case, when the node A 300 does not receive the reply message after a predetermined time passes, the node A 300 determines that the sensor node 400 does not support the adaptation layer function, thereby not performing header compression and transmitting a packet including all of an original IPv6 header to the sensor node 400.

Generally, data transmitted between sensor nodes has a small size. Thus, when such small sized data is transmitted via IP, a process of transmitting the data by fragmenting the data into a plurality of packets is more efficient than including the adaptation layer to perform the header compression.

The header compression and packet transmission procedure in the sensor network and the apparatus therefor according to aspects of the present invention distinguish a node supporting the adaptation layer function and a node that does not support the adaptation layer function, and determine whether or not to compress the packet, thereby enabling a node transmitting data to transmit the data having a form that is acceptable to a sensor node receiving the data. By doing so, an efficient packet transmission is possible.

In addition, aspects of the present invention can also be embodied as computer readable codes on a computer readable recording medium. The computer readable recording medium is any data storage device that can store data which can be thereafter read by a computer system. Examples of the computer readable recording medium also include read-only memory (ROM), random-access memory (RAM), CD-ROMs, DVDs, magnetic tapes, floppy disks, and optical data storage devices. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A header compression and packet transmission method in a sensor network, the method comprising:
   transmitting an inquiry message to a sensor node in the sensor network inquiring whether the sensor node supports an adaptation layer function to perform compression of an Internet Protocol (IP) header, wherein the transmitting of the inquiry message comprises:
   determining a value from among reserved values in a command type field of an IEEE 802.15.4 MAC (Media Access Control) frame designated as an adaptation layer capability request type, and
   setting the value corresponding to the adaptation layer capability request type in a command type field of an IEEE 802.15.4 MAC frame comprised in the inquiry message;
   receiving a reply message transmitted from the sensor node using a function of a lower layer used by the sensor node;
   analyzing the reply message and determining whether the sensor node supports the adaptation layer function to perform compression of an IP header, according to the analyzed reply message;
   compressing an IP header and transmitting a packet with the compressed IP header to the sensor node when it is determined that the sensor node supports the adaptation layer function to perform compression of an IP header; and
   transmitting a packet to the sensor node without compressing the IP header when it is determined that the sensor node does not support the adaptation layer function,
   wherein if the sensor node does not support the adaptation layer function, the transmitting the packet to the sensor node comprises fragmenting the packet into a plurality of packets and then transmitting the plurality of packets to the sensor node without compressing the IP header.

2. The header compression and packet transmission method of claim 1, wherein the adaptation layer is an IEEE (Institute of Electrical and Electronics Engineers)802.15.4 ZigBee adaptation layer.

3. The header compression and packet transmission method of claim 1, wherein the lower layer used by the sensor node is an IEEE 802.15.4 MAC (Media Access Control) layer.

4. The header compression and packet transmission method of claim 1, wherein the determining of whether the sensor node supports the adaptation layer function comprises determining that the sensor node supports the adaptation layer function when a value corresponding to an adaptation layer capability acknowledgement type is set in a command type field of an IEEE 802.15.4 MAC frame comprised in the reply message.

5. The header compression and packet transmission method of claim 1, wherein the determining of whether the sensor node supports the adaptation layer function comprises determining that the sensor node does not support the adaptation layer function when a value corresponding to an adaptation layer capability reject type is set in the command type field of a IEEE 802.15.4 MAC frame comprised in the reply message.

6. A header compression and packet transmission apparatus in a sensor network, the apparatus comprising:

an inquiry message transmission unit to transmit an inquiry message to a sensor node in the sensor network inquiring whether the sensor node supports an adaptation layer function to perform compression of an Internet Protocol (IP) header, wherein the inquiry message transmission unit determines a value from among reserved values in a command type field of an IEEE 802.15.4 MAC (Media Access Control) frame designated as an adaptation layer capability request type, and sets the value corresponding to the adaptation layer capability request type in a command type field of an IEEE 802.15.4 MAC frame in the inquiry message;

a reply message reception unit to receive a reply message corresponding to the inquiry message and which is transmitted from the sensor node by using a function of a lower layer used by the sensor node;

a determination unit to analyze the received reply message and to determine whether the sensor node supports the adaptation layer function to perform compression of an IP header;

a header compression unit to compress an IP header in a packet when the determination unit determines that the sensor node supports the adaptation layer function to perform compression of an IP header, and does not compress an IP header in a packet when the determination unit determines that the sensor node does not support the adaptation layer function; and a packet transmission unit to transmit the packet to the sensor node, wherein if the sensor node does not support the adaptation layer function, the packet transmission unit fragments the packet into a plurality of packets, and then transmits the plurality of packets to the sensor node without compressing the IP header.

7. The header compression and packet transmission apparatus of claim 6, wherein the adaptation layer is an IEEE 802.15.4 ZigBee adaptation layer.

8. The header compression and packet transmission apparatus of claim 6, wherein the lower layer used by the sensor node is an IEEE 802.15.4 MAC (Media Access Control) layer.

9. The header compression and packet transmission apparatus of claim 6, wherein the determination unit determines that the sensor node supports the adaptation layer function when a value corresponding to an adaptation layer capability acknowledgement type is set in a command type field of an IEEE 802.15.4 MAC frame in the reply message.

10. The header compression and packet transmission apparatus of claim 6, wherein the determination unit determines that the sensor node does not support the adaptation layer function when a value corresponding to an adaptation layer capability reject type is set in a command type field of the IEEE 802.15.4 MAC frame in the reply message.

11. A non-transitory computer readable recording medium having recorded thereon a program to execute a header compression and packet transmission method in a sensor network, the header compression and packet transmission method comprising:

transmitting an inquiry message to a sensor node in the sensor network inquiring whether the sensor node supports an adaptation layer function to perform compression of an Internet Protocol (IP) header, wherein the transmitting of the inquiry message comprises:

determining a value from among reserved values in a command type field of an IEEE 802.15.4 MAC (Media Access Control) frame designated as an adaptation layer capability request type; and setting the value corresponding to the adaptation layer capability request type in a command type field of an IEEE 802.15.4 MAC frame comprised in the inquiry message;

receiving a reply message corresponding to the inquiry message transmitted from the sensor node using a function of a lower layer used by the sensor node;

analyzing the reply message and determining whether the sensor node supports the adaptation layer function to perform compression of an IP header according to the analyzed reply message;

compressing an IP header and transmitting a packet with the compressed IP header to the sensor node when it is determined that the sensor node supports the adaptation layer function to perform compression of an IP header; and transmitting a packet to the sensor node without compressing the IP header when it is determined that the sensor node does not support the adaptation layer function, wherein if the sensor node does not support the adaptation layer function, the transmitting the packet to the sensor node comprises fragmenting the packet into a plurality of packets and then transmitting the plurality of packets to the sensor node without compressing the IP header.

12. A mobile device in a sensor network, including a header compression and packet transmission apparatus, the apparatus comprising:

an inquiry message transmission unit to transmit an inquiry message to another sensor node in the network to determine whether the sensor node supports an adaptation layer function to perform compression of an Internet Protocol (IP) header, wherein the inquiry message transmission unit selects a value from among reserved values in a command type field of an IEEE 802.15.4 MAC (Media Access Control) frame designated as an adaptation layer capability request type, and sets the value corresponding to the adaptation layer capability request type in a command type field of an IEEE 802.15.4 MAC frame in the inquiry message;

a header compression unit to selectively compress at least a portion of a packet when the sensor node is determined to support the adaptation layer function to perform compression of an IP header; and a packet transmission unit to transmit the packet to the sensor node;

wherein the packet includes the compressed portion if the sensor node supports the adaptation layer function to perform compression of an IP header, and if the sensor node does not support the adaptation layer function, the packet transmission unit fragments the packet into a plurality of packets, and then transmits the plurality of packets to the sensor node without compressing the IP header.

13. The mobile device of claim 12, wherein the header compression and packet transmission apparatus further comprises:

a reply message reception unit to receive a reply message from the sensor node corresponding to the inquiry message; and wherein whether the sensor node supports the adaptation layer function is determined based on the reply message.

14. The mobile device of claim 13, wherein the reply message is transmitted from a layer of the sensor node lower than the adaptation layer.

15. The mobile device of claim 13, wherein the sensor node is determined to support the adaptation layer function when a value corresponding to an adaptation layer capability acknowledgement type is set in a command type field of an IEEE 802.15.4 MAC frame in the reply message.

16. The mobile device of claim 13, wherein the sensor node is determined not to support the adaptation layer function when a value corresponding to an adaptation layer capability reject type is set in a command type field of the IEEE 802.15.4 MAC frame in the reply message.

17. The mobile device of claim 12, wherein the sensor node is determined not to support the adaptation layer function if no reply message in response to the inquiry message is received after a predetermined period of time.

18. The mobile device of claim 12, wherein the adaptation layer is an IEEE 802.15.4 adaptation layer.

19. A method of compressing data and communicating with a sensor node in a sensor network, the method comprising:
    receiving a message inquiring whether the sensor node supports an adaptation layer function to perform compression of an Internet Protocol (IP) header;
    transmitting a reply message indicating whether the sensor node supports an adaptation layer function to perform compression of an IP header, wherein the transmitting the reply message comprises:
    setting a value corresponding to an adaptation layer capability acknowledgement type in a command type field of an IEEE 802.15.4 MAC (Media Access Control) frame in the reply message if the sensor node supports an adaptation layer function to perform compression of an IP header, and
    setting a value corresponding to an adaptation layer capability reject type in a command type field of the IEEE 802.15.4 MAC frame in the reply message if the sensor node does not support an adaptation layer function to perform compression of an IP header; and
    receiving a packet based on the content of the reply message,
    wherein receiving the packet comprises:
        receiving the packet including at least one compressed portion if the sensor node supports an adaptation layer function to perform compression of an IP header, and
        receiving a plurality of packets, the plurality of packets being fragments of the packet which is fragmented into a plurality of packets without compressing the IP header, if the sensor node does not support the adaptation layer function to perform compression of an IP header.

20. A device in a sensor network, the device comprising:
    an inquiry message reception unit to receive an inquiry message inquiring whether the mobile device supports an adaptation layer function to perform compression of an Internet Protocol (IP) header;
    a reply message transmission unit to transmit a reply message indicating whether the sensor node supports the adaptation layer function to perform compression of an IP header; and
    a packet reception unit to receive a packet based on the reply message, the packet including at least one compressed portion if the mobile device supports the adaptation layer function to perform compression of an IP header,
    wherein, if the mobile device supports the adaptation layer function to perform compression of an IP header, the reply message transmission unit sets a value corresponding to an adaptation layer capability acknowledgement type in a command type field of an IEEE 802.15.4 MAC (Media Access Control) frame in the reply message, and
    if the sensor node does not support the adaptation layer function, the packet the packet reception unit is to receive is fragmented into a plurality of packets without compressing the IP header, and the packet reception unit receives the plurality of packets.

21. The device of claim 20, wherein, if the mobile device does not support the adaptation layer function, the reply message transmission unit sets a value corresponding to an adaptation layer capability reject type in a command type field of the IEEE 802.15.4 MAC (Media Access Control) frame in the reply message.

22. The header compression and packet transmission method of claim 1, wherein, the analyzing the reply message and determining whether the sensor node supports the adaptation layer function according to the analyzed reply message comprises analyzing an adaptation layer capability flag corresponding to the capability of the sensor node to support the adaptation layer function.

23. The header and compression transmission apparatus of claim 6, wherein the determination unit analyzes the received reply message and determines whether the sensor node supports the adaptation layer function by analyzing an adaptation layer capability flag corresponding to the capability of the sensor node to support the adaptation layer function.

* * * * *

UNITED STATES PATENT AND TRADEMARK OFFICE
CERTIFICATE OF CORRECTION

| | |
|---|---|
| PATENT NO. | : 8,149,816 B2 |
| APPLICATION NO. | : 12/104748 |
| DATED | : April 3, 2012 |
| INVENTOR(S) | : Soo-hong Park |

Page 1 of 1

It is certified that error appears in the above-identified patent and that said Letters Patent is hereby corrected as shown below:

Title page Col. 1 (Inventors), Line 1, Delete "Gwanglu-si" and insert -- Gwangju-si --, therefor.

Column 8, Line 44, In Claim 2, delete "Engineers)802.15.4" and insert -- Engineers) 802.15.4 --, therefor.

Column 12, Line 22, In Claim 20, delete "the packet the packet" and insert -- the packet --, therefor.

Signed and Sealed this
Nineteenth Day of June, 2012

David J. Kappos
*Director of the United States Patent and Trademark Office*